United States Patent
Uchida et al.

(10) Patent No.: US 8,203,361 B2
(45) Date of Patent: Jun. 19, 2012

(54) CIRCUIT SYSTEM INCLUDING FIRST CIRCUIT SUB-SYSTEM, SECOND CIRCUIT SUB-SYSTEM AND BIDIRECTIONAL BUS, CIRCUIT SUB-SYSTEM AND METHOD

(75) Inventors: Atsushi Uchida, Kawasaki (JP); Hirotoshi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/719,944

(22) Filed: Mar. 9, 2010

(65) Prior Publication Data

US 2010/0164546 A1 Jul. 1, 2010

Related U.S. Application Data

(63) Continuation of application No. PCT/JP2007/067988, filed on Sep. 14, 2007.

(51) Int. Cl.
*H03K 19/0175* (2006.01)
*H03K 19/08* (2006.01)

(52) U.S. Cl. ............................................. 326/86; 326/90

(58) Field of Classification Search .................... 326/86, 326/90, 62, 30, 21; 327/108
See application file for complete search history.

(56) References Cited

U.S. PATENT DOCUMENTS

| | | | |
|---|---|---|---|
| 6,639,423 B2 * | 10/2003 | Martin et al. | 326/30 |
| 7,489,160 B2 * | 2/2009 | Kimura | 326/30 |

FOREIGN PATENT DOCUMENTS

| | | |
|---|---|---|
| JP | 58-24925 | 2/1983 |
| JP | 8-63431 | 3/1996 |
| JP | 9-54752 | 2/1997 |
| JP | 10-340101 | 12/1998 |
| JP | 11-8572 | 1/1999 |
| JP | 2000-250770 | 9/2000 |

OTHER PUBLICATIONS

International Search Report for PCT/JP2007/067988, mailed Dec. 11, 2007.
Japanese Office Action mailed Feb. 7, 2012 issued in corresponding Japanese Patent Application No. 2009-532032.

* cited by examiner

*Primary Examiner* — Daniel D Chang
(74) *Attorney, Agent, or Firm* — Staas & Halsey LLP

(57) ABSTRACT

A circuit system has a first and a second circuit sub-system, and a bidirectional bus, the first circuit sub-system having a first control circuit that receives a control signal for controlling the direction of the bidirectional bus, and controls the first sub-system to be either of a transmitting or a receiving state based on a state of the control signal, a first sending unit that receives the control signal, and outputs as a first control signal, and a second sending unit that receives the control signal, and outputs as a second control signal, the second circuit sub-system having a first receiving unit that receives the first control signal, a second receiving unit that receives the second control signal, and a second control circuit that controls the second sub-system to assume either the transmitting or the receiving state on the basis of the first and the second control signal.

9 Claims, 11 Drawing Sheets

CIRCUIT SYSTEM INCLUDING FIRST CIRCUIT SUB-SYSTEM, SECOND CIRCUIT SUB-SYSTEM AND BIDIRECTIONAL BUS, CIRCUIT SUB-SYSTEM AND METHOD

CROSS-REFERENCE TO RELATED APPLICATION

This is a continuation of Application PCT/JP2007/067988, filed on Sep. 14, 2007, the entire contents of which are incorporated herein by reference.

FIELD

The present art relates to a circuit system including a first circuit sub-system, a second circuit sub-system and a bidirectional bus.

BACKGROUND

Some circuits may use a bidirectional bus to transmit and receive data to and from another circuit. In such a circuit, a master device and a slave device may be connected via a bidirectional bus, and the master device may control the direction of data transmission and reception.

In this case, the master device inputs a bidirectional-bus control signal to the slave device to control the direction of data transmission and reception between the master device and the slave device. The relationship of the direction of data transmission and reception between the master device and the slave device may be the relationship in which the master device and the slave device are a transmitting side and a receiving side, respectively, or the master device and the slave device are a receiving side and a transmitting side, respectively.

On the other hand, when the bidirectional-bus control signal is inverted owing to some malfunction and, for example, both of the master device and slave device become transmitting sides, a bus fight may occur in which outputs collide on the bus. When a bus fight occurs, an element therein may be damaged, which may cause a failure in the device or devices. For example, when both of the master device and slave device become receiving sides, the bus has an intermediate potential state. At the intermediate potential state, the elements in the master device and slave device become instable, which may cause a failure in the device or devices.

[Patent Document 1] Japanese Laid-open Patent Publication No. 58-024925
[Patent Document 2] Japanese Laid-open Patent Publication No. 09-054752

SUMMARY

According to an aspect of an embodiment, a circuit system has a first circuit sub-system, a second circuit sub-system, and a bidirectional bus coupling the first circuit sub-system and second circuit sub-system, the first circuit sub-system having a first control circuit that receives a control signal for controlling the direction of the bidirectional bus, and controls the first sub-system to be either of a transmitting state or a receiving state based on a state of the control signal, a first sending unit that receives the control signal, and outputs as a first control signal, and a second sending unit that receives the control signal, and outputs as a second control signal, the second circuit sub-system having a first receiving unit that receives the first control signal from the first sending unit, a second receiving unit that receives the second control signal from the second sending unit, and a second control circuit that controls the second sub-system to assume either the transmitting state or the receiving state in accordance with the state of the first control signal received by the first receiving unit and the second control signal received by the second receiving unit when the first and second control signals indicate the same state, and controls the second sub-system to assume the receiving state when the first and second control signals indicate different states from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

With reference to drawings, an embodiment of the present art will be described below.

Figure 1:
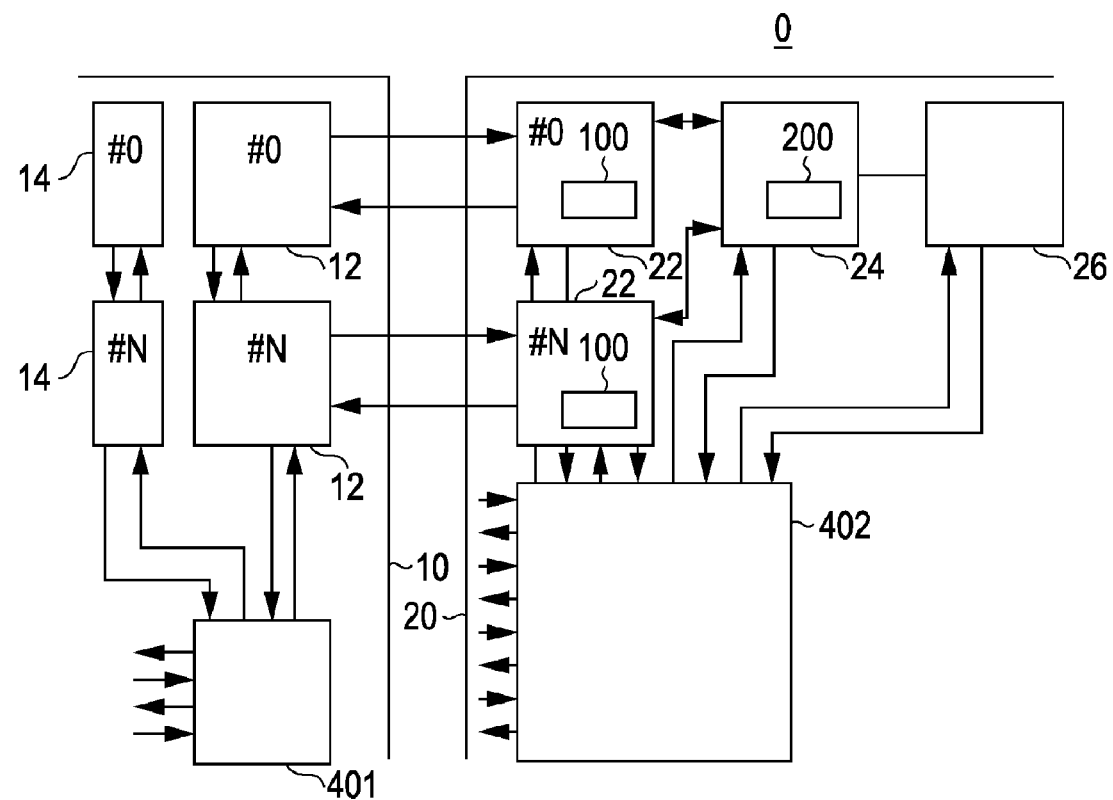
FIG. 1 is a diagram illustrating an information processing apparatus.

Information Processing Apparatus:

FIG. 1 illustrates an information processing apparatus 0. The Information Processing apparatus 0 includes a processor 10 and a shared memory 20. The processor 10 includes, for example, N+1 central processing units (CPUs) 14, inter-unit-interface control devices 12 connected to the CPUs 14, a processor system control unit 401 connected to the CPUs 14 and inter-unit-interface control devices 12. The shared memory 20 includes, for example, N+1 inter-unit-interface control devices 22 including a master device 100, a memory controller 24 including a slave device 200, a memory module 26, a shared memory system control unit 402 connected to the inter-unit-interface control devices 22, memory controller 24 and memory module 26.

The CPU 14 transmits an instruction to write or read data to the inter-unit-interface control device 12. The inter-unit-interface control device 12 transfers the instruction received from the CPU 14 to the inter-unit-interface control device 22. The inter-unit-interface control device 22 transmits the instruction transferred from the inter-unit-interface control device 12 to the memory controller 24. On the basis of the instruction received from the inter-unit-interface control device 22, the memory controller 24 performs memory access to the memory module 26 to write or read data. The shared memory system control unit 402 controls the direction of data transmission and reception between the master device 100 and the slave device 200, as will be described later.

Figure 2:
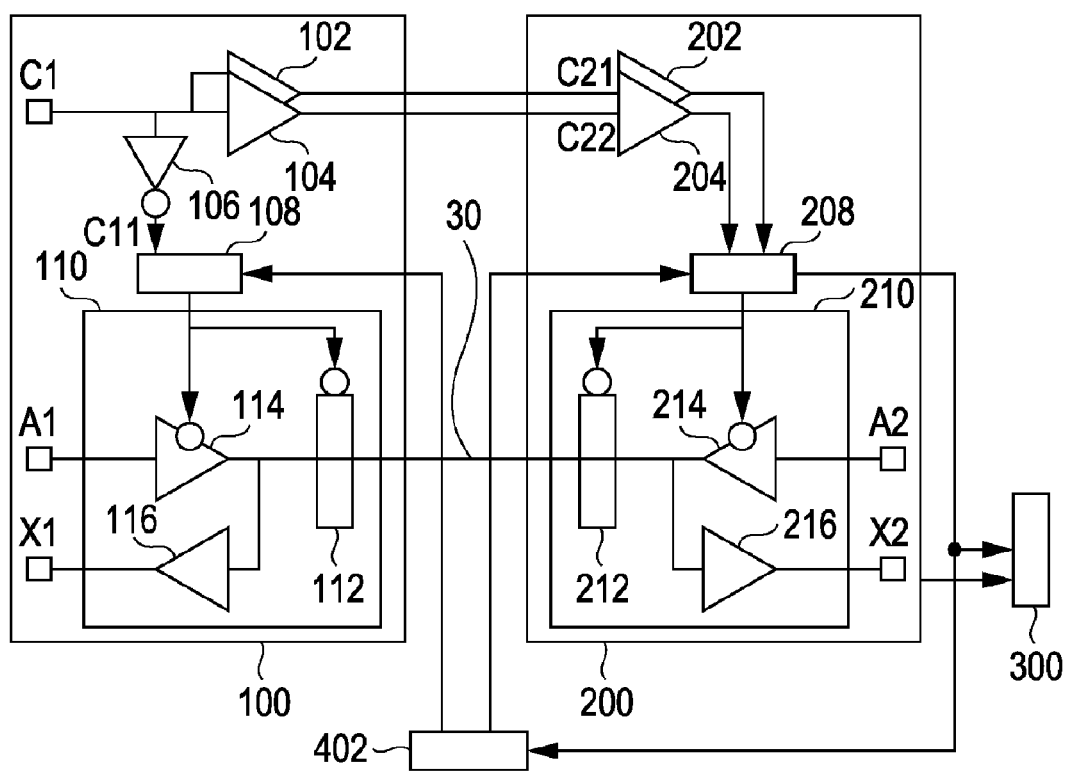
FIG. 2 is a diagram (Part 1) illustrating master device and a slave device.

Master Device:

FIG. 2 illustrates the master device 100 and the slave device 200.

The master device 100 includes a first input/output (IO) buffer (first transmitting means) 102, a second IO buffer (second transmitting means) 104, an inverter 106, a selection control circuit 108, an on-die termination (ODT) 112, a driver 114 having an enable terminal and a receiver 116. A bidirectional buffer 110 includes the on-die termination 112, driver 114 having an enable terminal and receiver 116.

The first IO buffer 102 receives the input of a bidirectional-bus control signal (first control signal) through an input end C1. The second IO buffer 104 also receives the input of a bidirectional-bus control signal through the input end C1. It is assumed here that, for example, when a bidirectional-bus control signal "1" is input through the input end C1, the master device 100 becomes the transmitting side and the slave device 200 becomes the receiving side. It is further assumed that when a bidirectional-bus control signal "0" is input through the input end C1, the master device 100 becomes the receiving side, and the slave device 200 becomes the transmitting side. The first IO buffer 102 and second IO buffer 104 output the bidirectional-bus control signals to the slave device 200.

The inverter 106 receives the input of a bidirectional-bus control signal through the input end C1. The inverter 106 inverts the input bidirectional-bus control signal and outputs it to the selection control circuit 108. The selection control circuit 108 selects the input bidirectional-bus control signal and outputs it to the on-die termination 112 and driver 114 having an enable terminal. The on-die termination 112 reduces the reflection of a signal. When the on-die termination 112 receives the input of the bidirectional-bus control signal "0", the master device 100 becomes the transmitting side. At that time, when the driver 114 having an enable terminal receives the input of data through the input end A1, the driver 114 having an enable terminal transmits the data via a bidirectional bus 30 to the slave device 200. On the other hand, when the on-die termination 112 receives the input of the bidirectional-bus control signal "1", the master device 100 becomes the receiving side, and the slave device 200 inputs data to the receiver 116. The receiver 116 outputs through the output end X1 the data input from the slave device 200.

Slave Device:

The slave device 200 includes a first IO buffer (first receiving means) 202, a second IO buffer (second receiving means) 204, a selection control circuit 208, an on-die termination 212, a driver 214 having an enable terminal and a receiver 216. A bidirectional buffer 210 includes the on-die termination 212, driver 214 having an enable terminal and receiver 216.

The first IO buffer 202 receives the input of a bidirectional-bus control signal from the first IO buffer 102 in the master device 100. The second IO buffer 204 receives the input of a bidirectional-bus control signal from the second IO buffer 104 in the master device 100. The first IO buffer 202 and second IO buffer 204 output the input bidirectional-bus control signals to the selection control circuit 208.

The selection control circuit 208 receives the input of the bidirectional-bus control signals from the first IO buffer 202 and second IO buffer 204. The selection control circuit 208 determines whether the bidirectional-bus control signals input from the first IO buffer 202 and second IO buffer 204 agree or not. The selection control circuit 208 selects the input bidirectional-bus control signal and outputs it to the on-die termination 212 and driver 214 having an enable terminal.

When the on-die termination 212 receives the input of the bidirectional-bus control signal "1", the slave device 200 becomes the receiving side. The receiver 216 outputs through the output end X2 the signal input from the master device 100. When the on-die termination 112 receives the input of the bidirectional-bus control signal "0", the slave device 200 becomes the transmitting side. At that time, when the driver 214 having an enable terminal receives the input of data through the input end A2, the output of the driver 214 having an enable terminal is transmitted to the master device 100 via the bidirectional bus 30.

For example, one of the IO buffers may be an inverter, as will be described later. The shared memory system control unit 402 may include a detecting circuit that detects noise. The detecting circuit may be caused to detect whether the signal output by the inverter contains noise or not, and, on the basis of the detection result, the bidirectional-bus control signal to be used may be determined.

Figure 3:
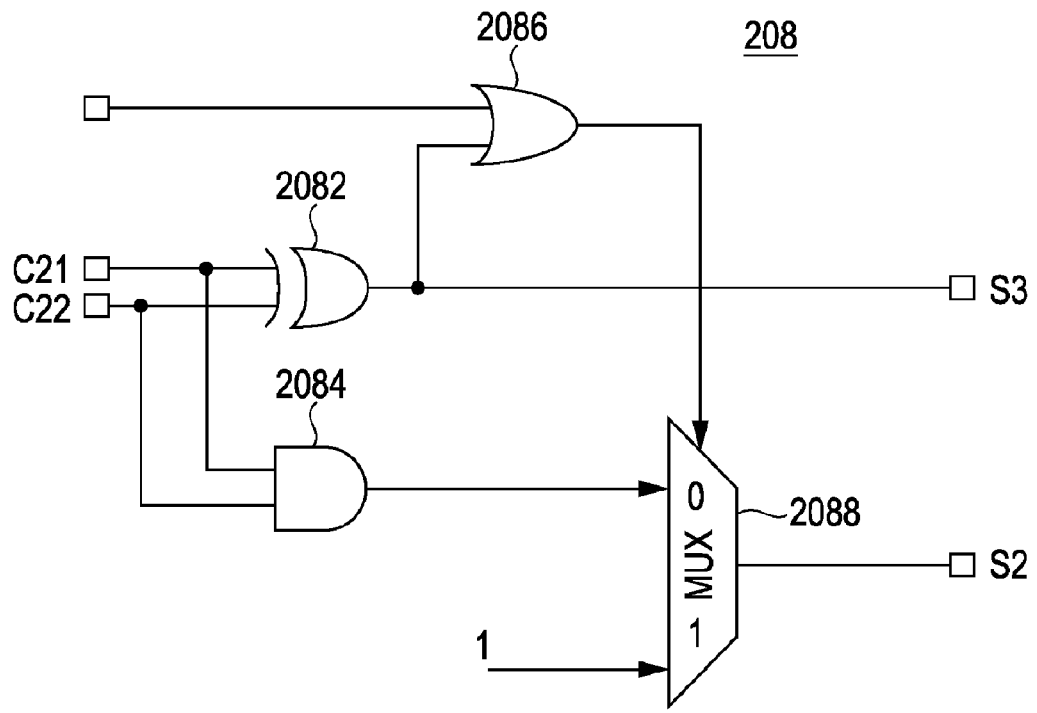
FIG. 3 is a diagram (Part 1) illustrating a first selection control circuit.

Control Means:

FIG. 3 illustrates the selection control circuit 208 illustrated in FIG. 2. The selection control circuit 208 includes an AND circuit 2084, an exclusive OR circuit 2082, an OR circuit 2086 and a selector 2088. The AND circuit 2084 receives the input of bidirectional-bus control signals from the first IO buffer 202 and second IO buffer 204 through the input end C21 and input end C22. The AND circuit 2084 performs AND processing on the input bidirectional-bus control signal, and outputs the processing result to the selector 2088.

The exclusive OR circuit 2082 receives the input of bidirectional-bus control signals from the first IO buffer 202 and second IO buffer 204 through the input end C21 and input end C22. The exclusive OR circuit 2082 performs exclusive OR processing on the input bidirectional-bus control signals and outputs the processing result to the OR circuit 2086 and outputs it to the fixed-value output circuit 300 and the shared memory system control unit 402 through an output end S3. The exclusive OR circuit 2082 is determining means for determining whether the control signal received by the first IO buffer 202 (first receiving means) and the control signal received by the second IO buffer 204 (second receiving means) agree or not. The fixed-value output circuit 300 and shared memory system control unit 402 will be described later.

The OR circuit 2086 receives the input of the output of the exclusive OR circuit 2082 and the output of the shared memory system control unit 402. The OR circuit 2086 performs OR processing on the output of the input exclusive OR circuit 2082 and the output of the shared memory system control unit 402 and outputs the processing result to the selector 2088.

The selector 2088 receives the input of a selection control signal from the OR circuit 2086 and a bidirectional-bus control signal from the AND circuit 2084 and a fixed value "1". On the basis of the selection control signal, the selector 2088 outputs one of the bidirectional-bus control signal and fixed value "1" through the output end S2 to the on-die termination 212 and driver 214 having an enable terminal.

Figure 4:
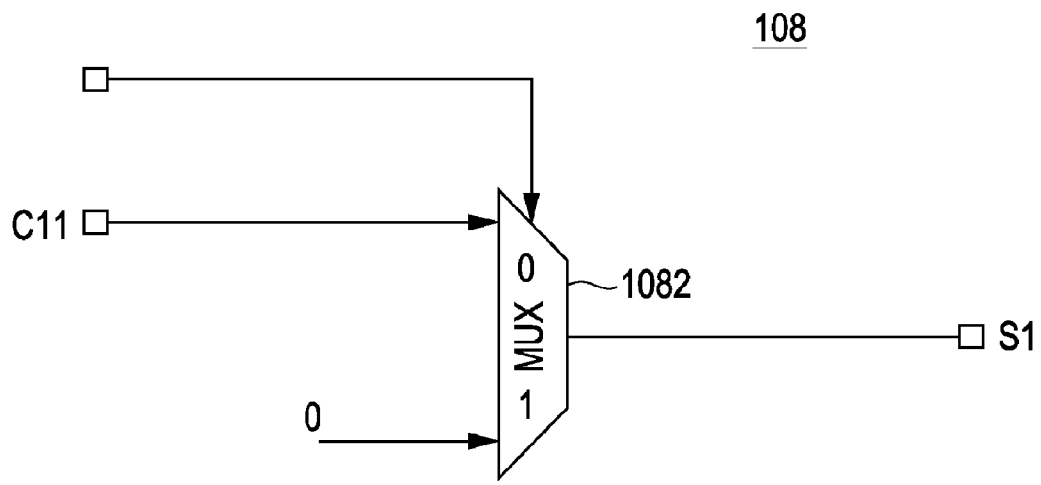
FIG. 4 is a diagram (Part 1) illustrating a second selection control circuit.

Control Means:

FIG. 4 illustrates the selection control circuit 108 illustrated in FIG. 2. The selection control circuit 108 includes a selector 1082. The selector 1082 receives the input of a selection control signal from the shared memory system control unit 402, a bidirectional-bus control signal from the inverter 106 through the input end C11 and a fixed value "0". On the basis of the selection control signal, the selector 1082 outputs one of the bidirectional-bus control signal and the fixed value "0" through an output end S1 to the on-die termination 112 and inverter having an enable terminal 114.

Figure 5:
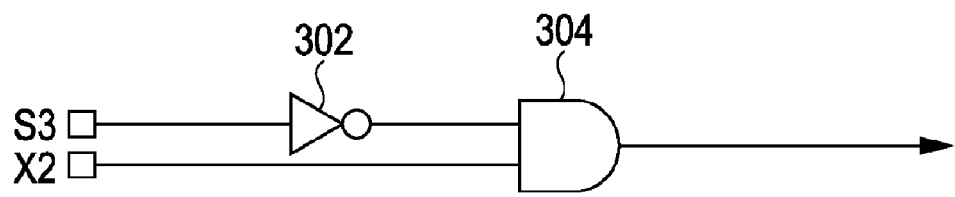
FIG. 5 is a diagram illustrating a fixed-value output circuit.

Output Means:

FIG. 5 illustrates the fixed-value output circuit 300 illustrated in FIG. 2. The fixed-value output circuit 300 includes an inverter 302 and an AND circuit 304. The inverter 302 receives the input of the output of the exclusive OR circuit 2082 illustrated in FIG. 3 through the input end S3. The inverter 302 inverts the input from the exclusive OR circuit 2082 and outputs it to the AND circuit 304. The AND circuit 304 receives the input of the output of the inverter 302 and the output of the receiver 216 illustrated in FIG. 2 through the input end X2. The AND circuit 2084 performs AND processing on the input outputs from the inverter 302 and receiver 116 and outputs the signal to the core circuit in the memory controller 24.

Figure 6:
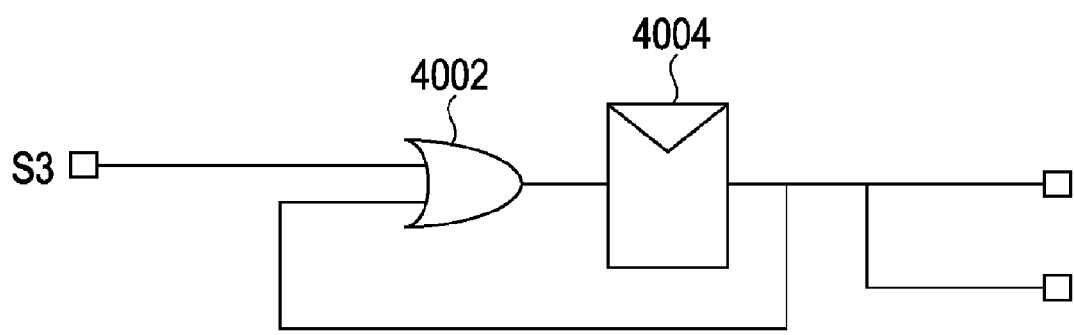
FIG. 6 is a diagram illustrating a system control device.

Creating Means:

FIG. 6 illustrates the shared memory system control unit 402 illustrated in FIG. 1. The shared memory system control unit 402 includes an OR circuit 4002 and a flip-flop circuit 4004. One input end of the OR circuit 4002 receives the input of the output of the exclusive OR circuit 2082 in the selection control circuit 208 through the input end S3. The other input end of the OR circuit 4002 receives the input of the output of the flip-flop circuit 4004. Upon system power-up, the output of the flip-flop circuit 4004 is "0". Upon system power-down, the value held by the flip-flop circuit 4004 is reset. The flip-flop circuit 4004 outputs its holding value (which is a second control signal) to the selection control circuits 108 and 208.

When Master Device is Transmitting Side and Bidirectional-Bus Control Signals Agree:

There will be described the data transmission and reception between the master device 100 and the slave device 200 in a case where it is defined that when the bidirectional-bus control signal "1" is input to the input end C1, the master device 100 becomes the transmitting side and the slave device 200 becomes the receiving side and it is defined that the agreement of the bidirectional-bus control signals is "0" and the disagreement is "1". It is assumed here that the bidirectional-bus control signals are not inverted.

In order to control the master device 100 and the slave device 200 so as to be the transmitting side and the receiving side, respectively, the bidirectional-bus control signal "1" is input from the input end C1 to the inverter 106, first IO buffer 102 and second IO buffer 104. The first IO buffer 102 and second IO buffer 104 output the input bidirectional-bus control signal "1" to the first IO buffer 202 and second IO buffer 204 in the slave device 200.

The first IO buffer 202 and second IO buffer 204 output the input bidirectional-bus control signal "1" to the selection control circuit 208.

Figure 7:
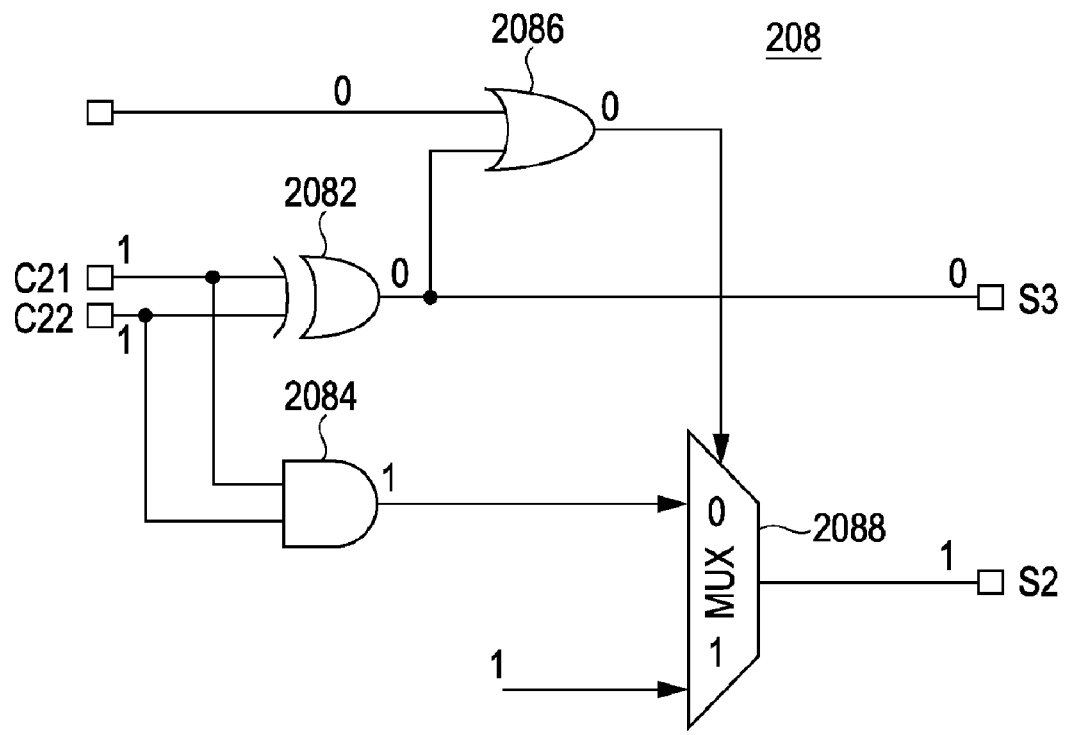
FIG. 7 is a diagram (Part 2) illustrating the first selection control circuit.

As illustrated in FIG. 7, through the input ends C21 and C22, the bidirectional-bus control signal "1" is input to the exclusive OR circuit 2082 and AND circuit 2084. The exclusive OR circuit 2082 performs exclusive OR processing on the input bidirectional-bus control signals "1" and "1" and outputs the signal "0" to the OR circuit 2086 and output end S3.

The AND circuit 2084 performs AND processing on the input bidirectional-bus control signal "1" and "1" and outputs the signal "1" to the selector 2088. From the output end S3, the signal "0" indicating that the bidirectional-bus control signals agree is input to the fixed-value output circuit 300 and shared memory system control unit 402. The OR circuit 4002 in the shared memory system control unit 402 receives the input of the signal "0". Since the output of the flip-flop circuit 4004 is "0" upon system power-up, the OR circuit 4004 performs OR processing on the signal "0" and output "0" and outputs the signal "0" to the flip-flop circuit 4004. The flip-flop circuit 4004 holds the signal "0" input from the OR circuit 4002, and outputs the signal "0" to the OR circuit 2086 in the selection control circuit 208 and the selector 1082 in the selection control circuit 108.

The OR circuit 2086 performs OR processing on the signal "0" input from the exclusive OR circuit 2082 and the signal "0" input from the shared memory system control unit 402 and inputs the signal "0" to the selection control input of the selector 2088.

The selector 2088 receives the input of the signal "1" from the AND circuit 2084 and the fixed value "1", and the selection control input receives the input of the signal "0". Thus, the selector 2088 outputs the signal "1" input from the AND circuit 2084 through the output end S2 to the on-die termination 212 and driver 214 having an enable terminal.

Since the on-die termination 212 receives the input of the signal "1", the on-die termination 212 comes to have an operating state. Since the driver 214 having an enable terminal receives the input of the signal "1", the driver 214 having an enable terminal is no longer able to transmit the data input through the input end A2 to the master device 100. As a result, the slave device 200 becomes the data receiving side.

Figure 8:
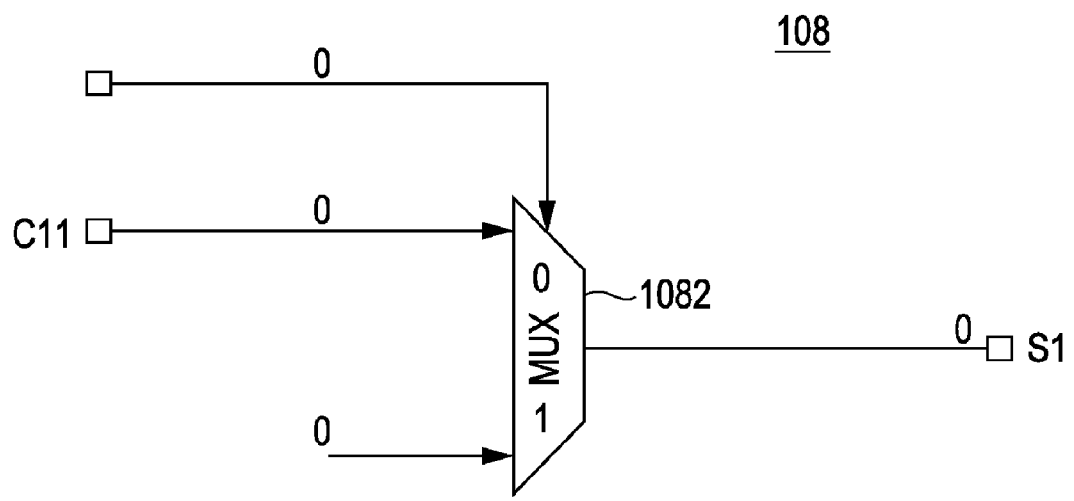
FIG. 8 is a diagram (Part 2) illustrating the second selection control circuit.

As illustrated in FIG. 8, the signal "0" resulting from the inversion of the bidirectional-bus control signal "1" by the inverter 106 is input through the input end C11 to the selector 1082.

The selector 1082 receives the input of the signal "0" from the inverter 106 and the fixed value "0", and the selection control input receives the signal "0" from the shared memory system control unit 402, as described above. Thus, the selector 1082 outputs the signal "0" input from the inverter 106 through the output end S1 to the on-die termination 112 and driver 114 having an enable terminal.

Since the on-die termination 112 receives the input of the signal "0", the on-die termination 112 comes to have a non-operating state. Since the driver 114 having an enable terminal receives the input of the signal "0", the driver 114 having an enable terminal is enabled to transmit the data input through the input end A1 to the slave device 200. Thus, the master device 100 becomes the data transmitting side.

As described above, the master device 100 outputs the data input through the input end A1 via the bidirectional bus 30 to the receiver 216 in the slave device 200. The receiver 216 outputs the input data through the output end X2.

Case where Master Device is Transmitting Side and Bidirectional-bus control signals do not agree:

It is assumed that the bidirectional-bus control signals are inverted.

In order to control the master device 100 and the slave device 200 so as to be the transmitting side and the receiving side, respectively, the bidirectional-bus control signal "1" is input through the input end C1 to the inverter 106, first IO buffer 102 and second IO buffer 104. The first IO buffer 102 and second IO buffer 104 output the input bidirectional-bus control signal "1" to the first IO buffer 202 and second IO buffer 204 in the slave device 200.

The first IO buffer 202 and second IO buffer 204 output the input bidirectional-bus control signals "1" to the selection control circuit 208. Here, the bidirectional-bus control signal is inverted, and the signal "0" resulting from the inversion of the bidirectional-bus control signal "1" is input to the first IO buffer 202.

Figure 9:
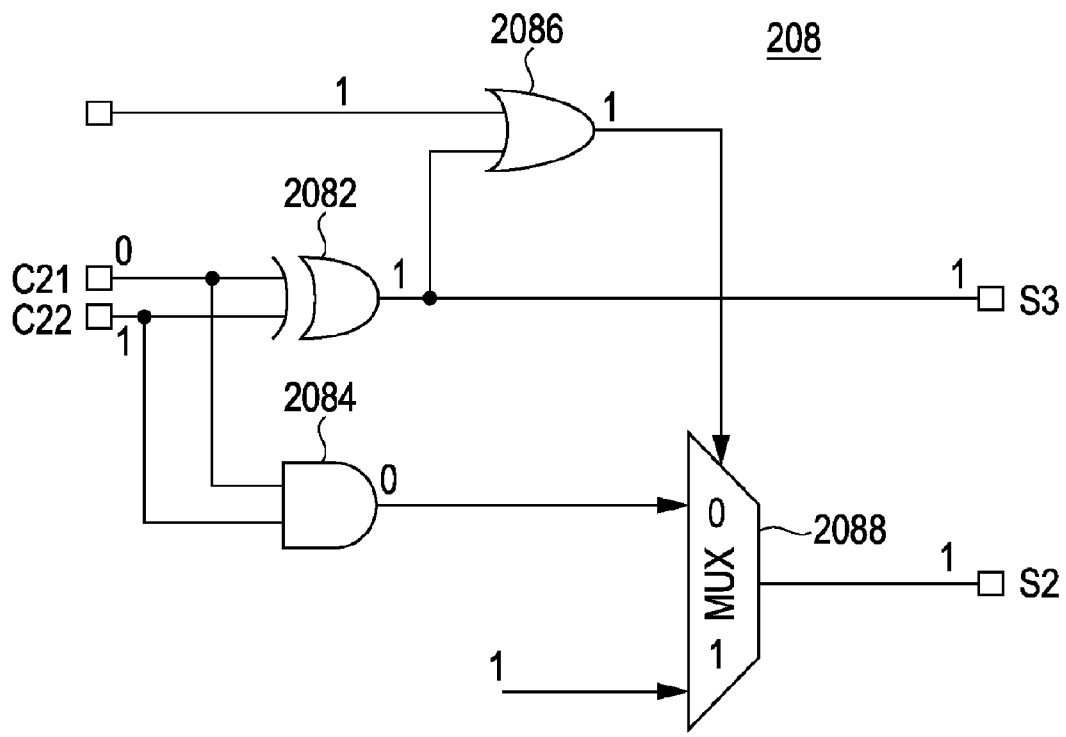
FIG. 9 is a diagram (Part 3) illustrating the first selection control circuit.

As illustrated in FIG. 9, through the input end C21 and the input end C22, the bidirectional-bus control signal "0" and the bidirectional-bus control signal "1", respectively, are input to the exclusive OR circuit 2082 and AND circuit 2084. The exclusive OR circuit 2082 performs exclusive OR processing on the input bidirectional-bus control signal "0" and "1" and outputs the signal "1" to the OR circuit 2086 and output end S3.

The AND circuit 2084 performs AND processing on the input bidirectional-bus control signals "0" and "1" and outputs the signal "0" to the selector 2088. Though the output end S3, the signal "1" indicating that the bidirectional-bus control signals do not agree is input to the fixed-value output circuit 300 and shared memory system control unit 402. The OR circuit 4002 in the shared memory system control unit 402 receives the input of the signal "1". Since the output of the flip-flop circuit 4004 upon system power-up is "0", the OR circuit 4004 performs OR processing on the signal "1" and output "0" and outputs the signal "1" to the flip-flop circuit 4004. The flip-flop circuit 4004 holds the signal "1" input from the OR circuit 4002 and outputs the signal "1" to the OR circuit 2086 in the selection control circuit 208 and the selector 1082 in the selection control circuit 108.

The OR circuit 2086 performs OR processing on the signal "1" input from the exclusive OR circuit 2082 and the signal "1" input from the shared memory system control unit 402 and inputs the signal "1" to the selection control input of the selector 2088.

The selector 2088 receives the input of the signal "0" from the AND circuit 2084 and the fixed value "1", and the selection control input receives the input of the signal "1". Thus, the selector 2088 outputs the fixed value "1" through the output end S2 to the on-die termination 212 and driver 214 having an enable terminal.

Since the on-die termination 212 receives the input of the signal "1", the on-die termination 212 comes to have an operating state. Since the driver 214 having an enable terminal receives the input of the signal "1", the driver 214 having an enable terminal is disabled to transmit the data input through the input end A2 to the master device 100. Thus, the slave device 200 becomes the data receiving side.

Figure 10:
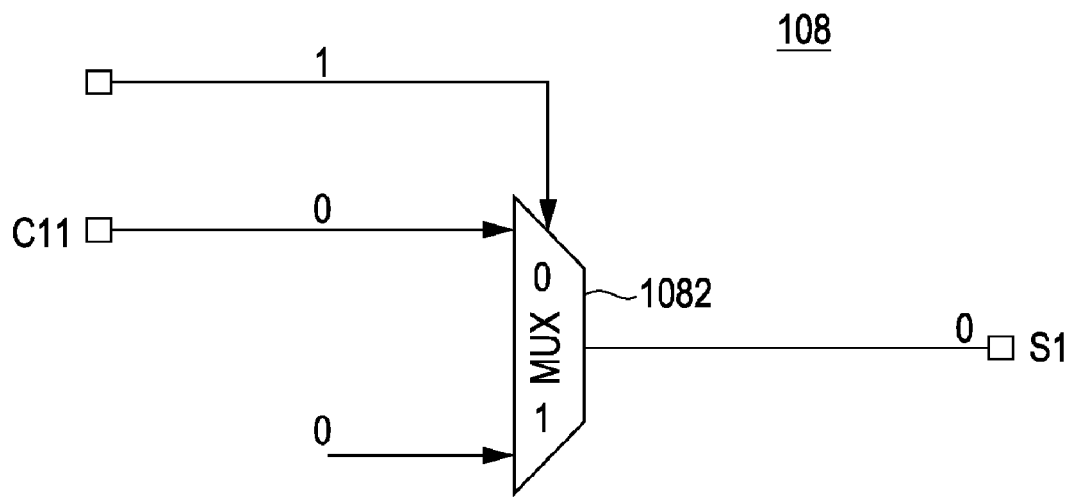
FIG. 10 is a diagram (Part 3) illustrating the second selection control circuit.

As illustrated in FIG. 10, the signal "0" resulting from the inversion of the bidirectional-bus control signal "1" by the inverter 106 is input through the input end C11 to the selector 1082.

The selector 1082 receives the input of the signal "0" from the inverter 106 and the fixed value "0". The selection control input receives the input of the signal "1" from the shared memory system control unit 402, as described above. Thus, the selector 1082 outputs the fixed value "0" through the output end S1 to the on-die termination 112 and driver 114 having an enable terminal.

Since the on-die termination 112 receives the input of the signal "0", the on-die termination 112 comes to have a non-operating state. Since the driver 114 having an enable terminal receives the input of the signal "0", the driver 114 having an enable terminal is enabled to transmit the data input through the input end A1 to the slave device 200. Thus, the master device 100 becomes the data transmitting side.

As described above, even if the bidirectional-bus control signals do not agree, the master device 100 can be the transmitting side while the slave device 200 can be the receiving side. This can prevent the occurrence of a bus fight and/or an intermediate potential state. By controlling the slave device 200 so as to be the receiving side at least, the occurrence of a bus fight can be prevented.

Case where Master Device is Receiving Side and Bidirectional-Bus Control Signals Agree:

A case will be described where the master device 100 and the slave device 200 are controlled so as to be the receiving side and the transmitting side, respectively.

In order to control the master device 100 and the slave device 200 so as to be the receiving side and the transmitting side, respectively, the bidirectional-bus control signal "0" is input through the input end C1 to the inverter 106, first IO buffer 102 and second IO buffer 104. The first IO buffer 102 and second IO buffer 104 output the input bidirectional-bus control signal "0" to the first IO buffer 202 and second IO buffer 204 in the slave device 200.

The first IO buffer 202 and second IO buffer 204 output the input bidirectional-bus control signals "0" to the selection control circuit 208.

Figure 11:
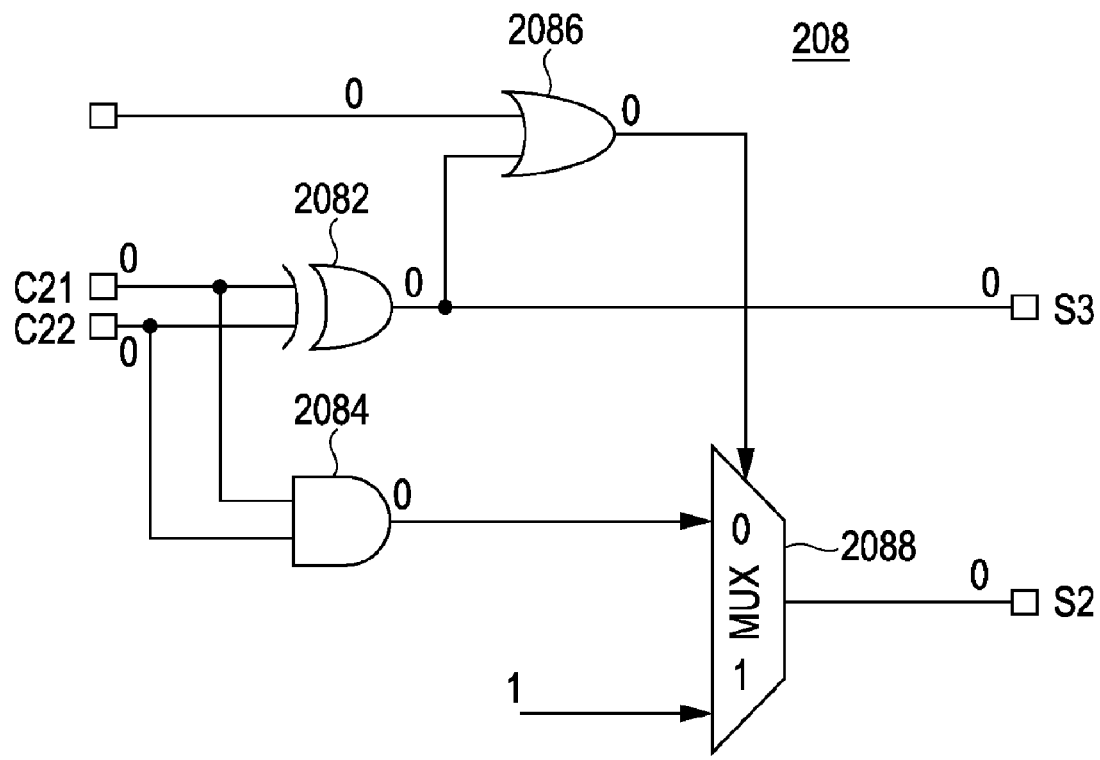
FIG. 11 is a diagram (Part 4) illustrating the first selection control circuit.

As illustrated in FIG. 11, through the input ends C21 and C22, the bidirectional-bus control signals "0" are input to the exclusive OR circuit 2082 and AND circuit 2084. The exclusive OR circuit 2082 performs exclusive OR processing on the input bidirectional-bus control signals "0" and "0" and outputs the signal "0" to the OR circuit 2086 and output end S3.

The AND circuit 2084 performs AND processing on the input bidirectional-bus control signals "0" and "0" and outputs the signal "0" to the selector 2088. Through the output end S3, the signal "0" indicating that the bidirectional-bus control signals agree is input to the fixed-value output circuit 300 and shared memory system control unit 402. The OR circuit 4002 in the shared memory system control unit 402 receives the input of the signal "0". Since the output of the flip-flop circuit 4004 upon system power-up is "0", the OR circuit 4004 performs OR processing on the signal "0" and the output "0" and outputs the signal "0" to the flip-flop circuit 4004. The flip-flop circuit 4004 holds the signal "0" input from the OR circuit 4002 and outputs the signal "0" to the OR circuit 2086 in the selection control circuit 208 and the selector 1082 in the selection control circuit 108.

The OR circuit 2086 performs OR processing on the signal "0" input from the exclusive OR circuit 2082 and the signal "0" input from the shared memory system control unit 402 and inputs the signal "0" to the selection control input in the selector 2088.

The selector 2088 receives the input of the signal "0" form the OR circuit 2086 and the fixed value "0" while the selection control input receives the input of the signal "0". Thus, the selector 2088 outputs the signal "0" input from the OR circuit 2086 through the output end S2 to the on-die termination 212 and driver 214 having an enable terminal.

Since the on-die termination 212 receives the input of the signal "0", the on-die termination 212 is changed to have a non-operating state. Since the driver 214 having an enable terminal receives the input of the signal "0", the driver 214 having an enable terminal is enabled to transmit the data input through the input end A2 to the master device 100. Thus, the slave device 200 becomes the data transmitting side.

Figure 12:
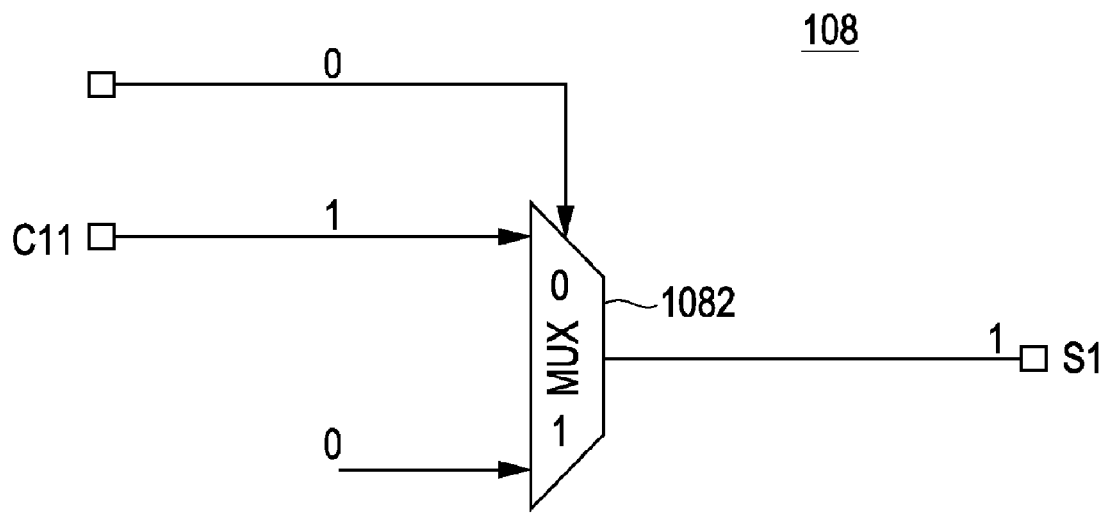
FIG. 12 is a diagram (Part 4) illustrating the second selection control circuit.

As illustrated in FIG. 12, through the input end C1, the signal "1" resulting from the inversion of the bidirectional-bus control signal "0" by the inverter 106 is input to the selector 1082.

The selector 1082 receives the input of the signal "1" from the inverter 106 and the fixed value "0", and the selection control input receives the input of the signal "0" from the shared memory system control unit 402, as described above. Thus, the selector 1082 outputs the signal "1" input from the inverter 106 through the output end S1 to the on-die termination 112 and driver 114 having an enable terminal.

Since the on-die termination 112 receives the input of the signal "1", the on-die termination 112 is changed to have an operating state. Since the driver 114 having an enable terminal receives the input of the signal "1", the driver 114 having an enable terminal is disabled to transmit the data input through the input end A1 to the slave device 200. Thus, the master device 100 becomes the data receiving side.

As described above, the slave device 200 outputs the data input through the input end A2 to the receiver 116 in the master device 100 via the bidirectional bus 30. The receiver 116 outputs the input data through the output end X1.

Case where Master Device is Receiving Side and Bidirectional-bus control signals Do Not Agree:

It is assumed here that the bidirectional-bus control signals are inverted.

In order to cause the master device 100 and the slave device 200 so as to be the receiving side and the transmitting side, respectively, the bidirectional-bus control signal "0" is input through the input end C1 to the inverter 106, first IO buffer 102 and second IO buffer 104. The first IO buffer 102 and second IO buffer 104 output the input bidirectional-bus control signals "0" to the first IO buffer 202 and second IO buffer 204 in the slave device 200.

The first IO buffer 202 and second IO buffer 204 output the input bidirectional-bus control signals "0" to the selection control circuit 208. It is assumed that the bidirectional-bus control signal is inverted, and the second IO buffer 204 receives the input of "1" resulting from the inversion of the bidirectional-bus control signal "0".

Figure 13:
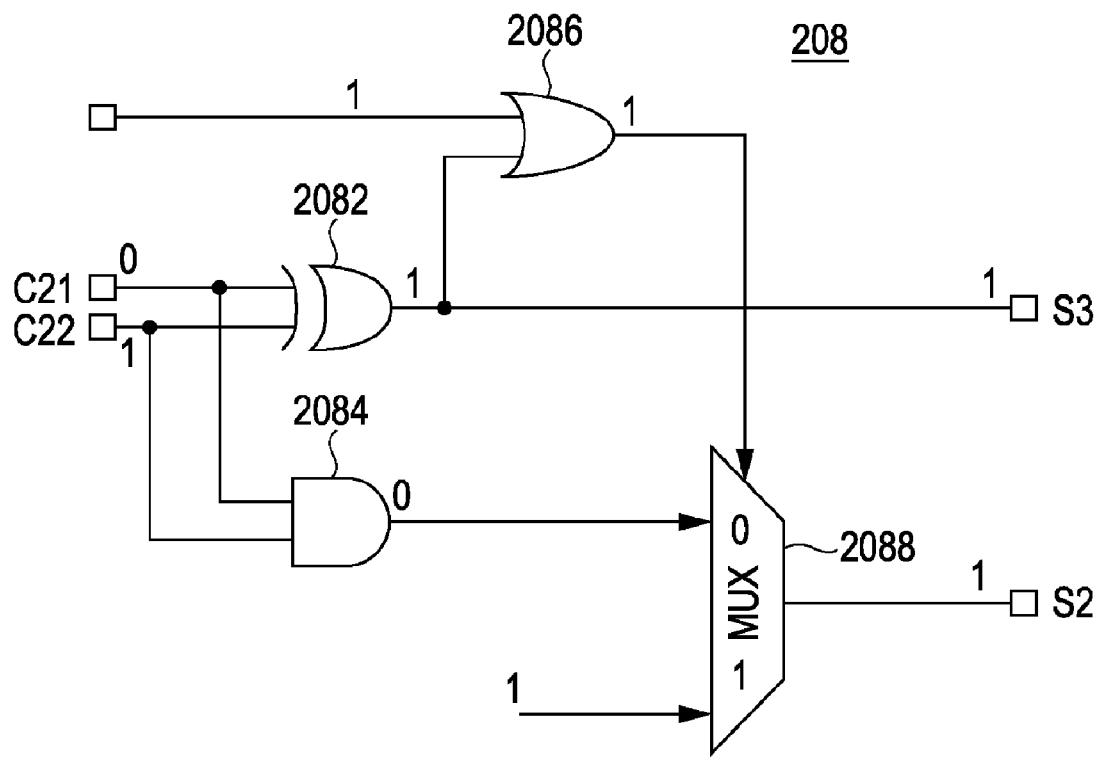
FIG. 13 is a diagram (Part 5) illustrating the first selection control circuit.

As illustrated in FIG. 13, the bidirectional-bus control signal "0" and bidirectional-bus control signal "1" are input through the input end C21 and input end C22, respectively, to the exclusive OR circuit 2082 and AND circuit 2084. The exclusive OR circuit 2082 performs exclusive OR processing on the input bidirectional-bus control signals "0" and "1" and outputs the signal "1" to the OR circuit 2086 and output end S3.

The AND circuit 2084 performs AND processing on the input bidirectional-bus control signals "0" and "1" and outputs the signal "0" to the selector 2088. Through the output end S3, the signal "1" indicating that the bidirectional-bus control signals do not agree is input to the fixed-value output circuit 300 and shared memory system control unit 402. The OR circuit 4002 in the shared memory system control unit 402 receives the input of the signal "1". Since the output of the flip-flop circuit 4004 upon system power-up is "0", the OR circuit 4004 performs OR processing on the signal "1" and output "0" and outputs the signal "1" to the flip-flop circuit 4004. The flip-flop circuit 4004 holds the signal "1" input from the OR circuit 4002 and outputs the signal "1" to the OR circuit 2086 in the selection control circuit 208 and the selector 1082 in the selection control circuit 108.

The OR circuit 2086 performs OR processing on the signal "1" input from the exclusive OR circuit 2082 and the signal "1" input from the shared memory system control unit 402 and inputs the signal "1" to the selection control input of the selector 2088.

The selector 2088 receives the input of the signal "0" from the AND circuit 2084 and the fixed value "1", and the selection control input receives the input of the signal "1". Thus, the selector 2088 outputs the fixed value "1" through the output end S2 to the on-die termination 212 and driver 214 having an enable terminal.

Since the on-die termination 212 receives the input of the signal "1", the on-die termination 212 is changed to have an operating state. Since the driver 214 having an enable terminal receives the input of the signal "1", the driver 214 having an enable terminal is disabled to transmit the data input through the input end A2 to the master device 100. Thus, the slave device 200 becomes the data receiving side.

Figure 14:
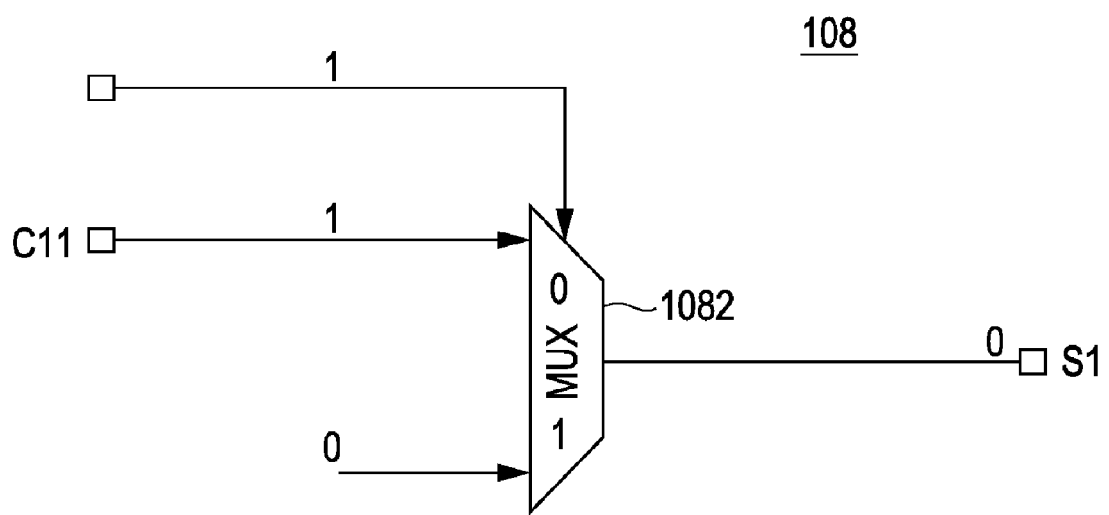
FIG. 14 is a diagram (Part 5) illustrating the second selection control circuit.

As illustrated in FIG. 14, through the input end C1, the signal "1" resulting from the inversion of the bidirectional-bus control signal "0" by the inverter 106 is input to the selector 1082.

The selector 1082 receives the input of the signal "1" from the inverter 106 and the fixed value "0". The selection control input receives the input of the signal "1" from the shared memory system control unit 402, as described above. Thus, the selector 1082 outputs the fixed value "0" through the output end S1 to the on-die termination 112 and driver 114 having an enable terminal.

Since the on-die termination 112 receives the input of the signal "0", the on-die termination 112 is changed to have a non-operating state. Since the driver 114 having an enable terminal receives the input of the signal "0", the driver 114 having an enable terminal is enabled to transmit the data input from the input end A1 to the slave device 200. Thus, the master device 100 becomes the data transmitting side.

As described above, even if the bidirectional-bus control signals do not agree, the master device 100 and the slave device 200 can be controlled so as to be the transmitting side and the receiving side, respectively, which can prevent the occurrence of a bus fight and/or an intermediate potential state. By controlling the slave device 200 so as to be receiving side at least, the occurrence of a bus fight can be prevented.

Figure 15:
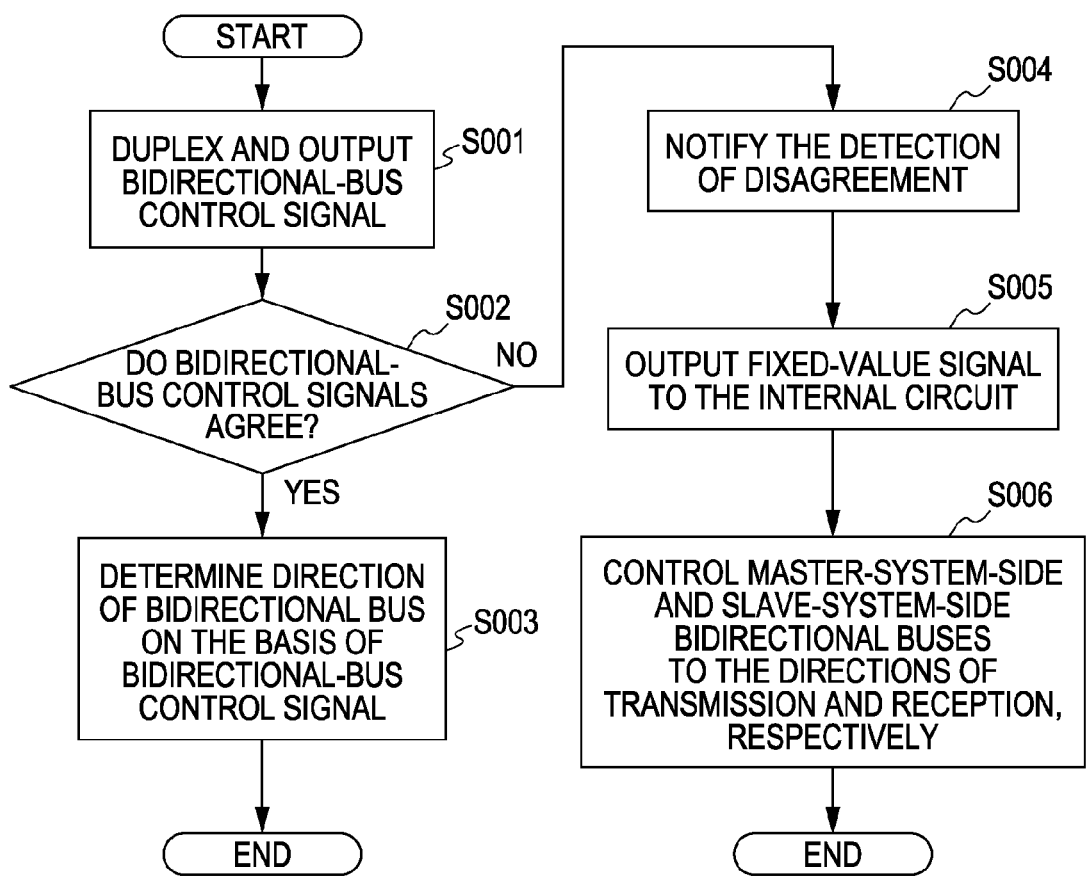
FIG. 15 is a flowchart illustrating processing by the system.

Flow of Processing by Entire System:

With reference to the flowchart illustrated in FIG. 15, a flow of processing by the entire system will be described below.

In step S001, the first IO buffer 102 and second IO buffer 104 output the bidirectional-bus control signal input through the input end C1 to the first IO buffer 202 and second IO buffer 204 in the slave device 200. Since each of the master device 100 and slave device 200 includes two IO buffers, the bidirectional-bus control signal can be duplicated, which can increase the reliability. The processing moves to step S002.

In step S002, the selection control circuit 208 determines whether the bidirectional-bus control signals output from the first IO buffer 202 and second IO buffer 204 agree or not. More specifically, the exclusive OR circuit 2082 included in the selection control circuit 208 performs exclusive OR processing on the bidirectional-bus control signals input from the first IO buffer 202 and second IO buffer 204 to determine whether the bidirectional-bus control signals agree or not. If the bidirectional-bus control signals agree, the processing result by the exclusive OR circuit 2082 is "0", and the exclusive OR circuit 2082 outputs the signal "0" to the fixed-value output circuit 300 and shared memory system control unit 402. The processing moves to step S003. On the other hand, if the bidirectional-bus control signals do not agree, the processing moves to step S004.

In step S003, on the basis of the corresponding bidirectional-bus control signals, the selection control circuit 108 included in the master device 100 and the selection control circuit 208 included in the slave device 200 control the direction of transmission and reception by the master device 100 and slave device 200. More specifically, as described with reference to FIG. 7 and FIG. 11, the signal selected by the selector 2088 in the selection control circuit 208 is output to the on-die termination 212 and driver 214 having an enable terminal so as to control the direction of transmission and reception by the slave device 200. As described with reference to FIG. 8 and FIG. 12, the signal selected by the selector 1082 in the selection control circuit 108 is output to the on-die termination 112 and driver 114 having an enable terminal so as to control the direction of transmission and reception by the master device 100. Then, the processing ends.

In step S004, the processing result by the exclusive OR circuit 2082 in the slave device 200 is "1", and the exclusive OR circuit 2082 outputs the signal "1" to the fixed-value output circuit 300 and shared memory system control unit 402. The processing moves to step S005.

In step S005, the inverter 302 in the fixed-value output circuit 300 receives the input of the signal "1" from the exclusive OR circuit 2082 in the selection control circuit 208. The inverter 302 outputs the signal "0" resulting from the inversion of the signal "1" to the AND circuit 304. The AND circuit 304 performs AND processing on the signal "0" input from the inverter 302 and the data input through the output end X2. Through the output end X2, a signal "0" or "1" is input. The AND circuit 304 outputs the signal "0" resulting from the AND processing to the core circuit in the memory controller 24. Thus, the signal "0" by which the core circuit does not misoperate can be output to the core circuit. The processing moves to step S006.

In step S006, the selection control circuit 108 included in the master device 100 and the selection control circuit 208 included in the slave device 200 control the master device 100 and slave device 200 so as to be the transmitting side and receiving side, respectively. More specifically, as described with reference to FIG. 9 and FIG. 13, the signal selected by the selector 2088 in the selection control circuit 208 is output to the on-die termination 212 and driver 214 having an enable terminal so as to control the direction of transmission and reception by the slave device 200. As described with reference to FIG. 10 and FIG. 14, the signal selected by the selector 1082 in the selection control circuit 108 is output to the on-die termination 112 and driver 114 having an enable terminal to control the master device 100 so as to be the data transmitting side. Then, the processing ends.

Applicability of this Embodiment

Figure 16:
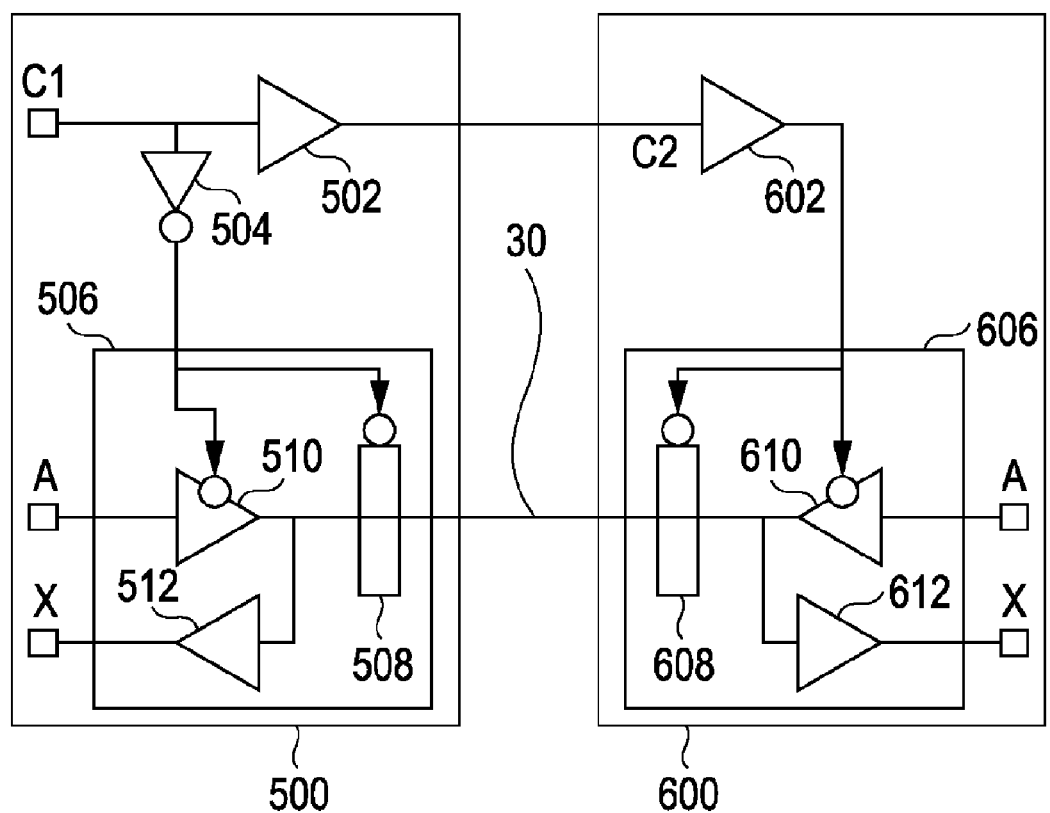
FIG. 16 is a diagram (Part 2) illustrating a master device and a slave device.

Finally, the applicability of this embodiment will be described. For example, a master device and slave device as illustrated in FIG. 16 will be considered. It is assumed that, in order to control a master device 500 and slave device 600 so as to be a transmitting side and a receiving side, respectively, a bidirectional-bus control signal "1" is input through the input end C1. When the bidirectional-bus control signal output from an IO buffer 502 to an IO buffer 602 is inverted for some reason and the bidirectional-bus control signal "0" is input to the IO buffer 602, the slave device 600 becomes the transmitting side and the buses collided. It is assumed that in order to control the master device 500 and slave device 600 so as to be the receiving side and the transmitting side, respectively, the bidirectional-bus control signal "0" is input through the input end C1. When the bidirectional-bus control signal output from the IO buffer 502 to the IO buffer 602 is inverted for some reason and the bidirectional-bus control signal "1" is input to the IO buffer 602, the slave device 600 also becomes the receiving side and the buses have an intermediate potential state.

On the other hand, according to this embodiment, a bidirectional-bus control signal is duplicated and output from a master device to a slave device. Furthermore, when the bidirectional-bus control signals do not agree, the system control unit controls the master device and the slave device as a transmitting side and a receiving side, respectively. This can prevent the collision of buses and or an intermediate potential state of the buses.

Figure 17:
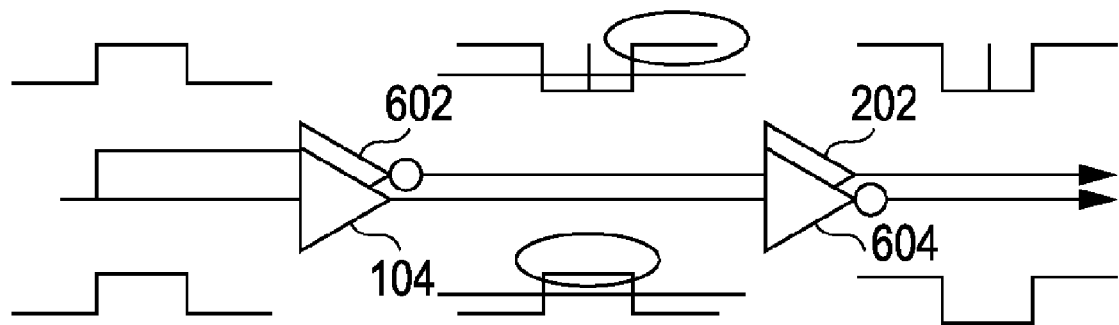
FIG. 17 is a diagram illustrating transmitting means and receiving means.

The aforementioned embodiment has been described for better understanding of the present art and does not limit the present art. The embodiment can be changed without departing from the spirit and scope of the present art. For example, the aforementioned embodiment is applicable to those connected via bidirectional buses with a stub series terminated logic (SSTL) 18 bidirectional buffer. For example, the slave device 200 may be provided in a processing apparatus. Having described according to the aforementioned embodiment that a bidirectional-bus control signal is duplicated by two IO buffers, other configurations are also possible. For example, as illustrated in FIG. 17, one of the transmitting means may be configured by an inverter 602, and one of the receiving means may be configured by an inverter 604. It is assumed that a signal as illustrated in FIG. 17 is input to the inverter 602 and IO buffer 104, and the signal output by the inverter 602 contains noise. The signal output by the inverter 602 is supposed to be "0" and the signal output by the IO buffer 104 is supposed to be "1". However, the signal of the part containing noise is "1". When detecting means for detecting noise is further provided and the detecting means detects the noise, the signals within the circles in FIG. 17 may be used. Thus, the control signals even containing noise can be transmitted accurately from the master device to the slave device.

For example, when both of the master device and slave device become receiving sides, the bus has an intermediate potential state. At the intermediate potential state, the elements in the master device and slave device become instable, which may cause a failure in the device or devices.

According to the present art, a bidirectional-bus control signal is duplicated and output from a master device to a slave device. When the bidirectional-bus control signals do not agree, the mater device and the slave device are controlled so as to be a data transmitting side and a data receiving side, respectively. This can prevent the collision of outputs on the bus or an intermediate potential state of the bus.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A circuit system comprising:
a first circuit sub-system,
a second circuit sub-system, and
a bidirectional bus coupling the first circuit sub-system and second circuit sub-system,
the first circuit sub-system comprising;
a first control circuit that receives a control signal for controlling the direction of the bidirectional bus, and controls the first sub-system to be either of a transmitting state or a receiving state based on a state of the control signal;
a first sending unit that receives the control signal, and outputs as a first control signal; and
a second sending unit that receives the control signal, and outputs as a second control signal;
the second circuit sub-system comprising;
a first receiving unit that receives the first control signal from the first sending unit;
a second receiving unit that receives the second control signal from the second sending unit; and
a second control circuit that controls the second sub-system to assume either the transmitting state or the receiving state in accordance with the state of the first control signal received by the first receiving unit and the second control signal received by the second receiving unit when the first and second control signals indicate the same state, and controls the second sub-system to assume the receiving state when the first and second control signals indicate different states from each other.

2. The circuit system of claim 1, wherein the first circuit sub-system further comprising a first output buffer coupled to the bidirectional bus, operable to assume either a transmitting state or a receiving state, for outputting an output signal onto the bidirectional bus when controlled to assume a transmitting state, and a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a transmitting state when the first and second control signals received by the first and second receiving units, respectively, indicate different states from each other.

3. The circuit system of claim 1, wherein the first circuit sub-system further comprising a first output buffer coupled to the bidirectional bus, operable to assume either a transmitting state or a receiving state, for outputting an output signal onto the bidirectional bus when controlled to assume a transmitting state, and a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a receiving state when the first and second control signals received by the first and second receiving units, respectively, indicate different states from each other.

4. A circuit sub-system connectable to other circuit sub-system via a bidirectional bus, the other circuit sub-system receiving a control signal for controlling the direction of the bidirectional bus, including a first output buffer coupled to the bidirectional bus, operable to assume either a transmitting state or a receiving state, for outputting an output signal onto the bidirectional bus when controlled to assume an transmitting state, a first input buffer coupled to the bidirectional bus for receiving an input signal from the bidirectional bus, and a first and a second sending units for sending out a first and a second control signals corresponding to the control signal, respectively, the circuit sub-system comprising:
a second output buffer coupled to the bidirectional bus, operable to assume either a transmitting state or a receiving state, for outputting an output signal onto the bidirectional bus when controlled to assume an active state;
a second input buffer coupled to the bidirectional bus for receiving an input signal from the bidirectional bus;
a first and a second receiving units for receiving the first and second control signals from the first and second sending units, respectively; and
an output buffer control circuit for controlling the second output buffer to assume either a transmitting state or a receiving state in accordance with the first and second control signals when the first and second control signals received by the first and second receiving units, respectively, consistently indicate the same state, and for controlling the second output buffer to assume a receiving state when the first and second control signals received by the first and second receiving units, respectively, indicate different states from each other.

5. The circuit sub-system of claim 4, wherein the other circuit sub-system further comprising a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a transmitting state when the first and second control signals received by the first and second receiving units, respectively, indicate different states from each other.

6. The circuit sub-system of claim 4, wherein the other circuit sub-system further comprising a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a receiving state when the first and second control signals received by the first and second receiving units, respectively, indicate different states from each other.

7. A method of controlling a circuit system including a first circuit sub-system, a second circuit sub-system, and a bidirectional bus coupling the first circuit sub-system and second circuit sub-system, the first circuit sub-system receiving a control signal for controlling the direction of the bidirectional bus, the method comprising:
sending out a first and a second control signals corresponding to the control signal by a first and a second sending units, respectively;
receiving the first and second control signals from the first and second sending units by a first and a second receiving units, respectively; and
controlling the second output buffer to assume either a transmitting state or a receiving state in accordance with the first and second control signals when the first and second control signals received by the first and second receiving units, respectively, consistently indicate the same state, and for controlling the second output buffer to assume a receiving state when the first and second control signals received by the first and second receiving units, respectively, indicate different states from each other by an output buffer control circuit.

8. The method of claim 7, wherein the first circuit subsystem further comprising a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a transmitting state when the first and second control signals received by the first and second receiving units, respectively, indicate different states from each other.

9. The method of claim 7, wherein the first circuit subsystem further comprising a first output buffer control circuit for controlling the first output buffer to assume either a transmitting state or a receiving state in accordance with the control signal when the first and second control signals received by the first and second receiving units, respectively, consistently indicate the same state, and for controlling the first output buffer to assume a receiving state when the first and second control signals received by the first and second receiving units, respectively, indicate different states from each other.

* * * * *